(12) United States Patent
Liang et al.

(10) Patent No.: US 8,536,970 B2
(45) Date of Patent: Sep. 17, 2013

(54) MULTILAYERED MINIATURE COIL COMPONENT

(75) Inventors: Kun-Yi Liang, Hsinchu County (TW); Chien-Chang Wang, Hsinchu County (TW); Chung-Chun Huang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/364,005

(22) Filed: Feb. 1, 2012

(65) Prior Publication Data

US 2013/0120096 A1    May 16, 2013

(30) Foreign Application Priority Data

Nov. 16, 2011  (TW) .............................. 100141902 A

(51) Int. Cl.
| | |
|---|---|
| *H01F 5/00* | (2006.01) |
| *H01F 27/28* | (2006.01) |
| *H01F 27/24* | (2006.01) |
| *H02K 11/00* | (2006.01) |
| *H02K 27/02* | (2006.01) |
| *H02K 1/22* | (2006.01) |

(52) U.S. Cl.
USPC ............. 336/200; 336/223; 336/232; 310/71; 310/208; 310/268

(58) Field of Classification Search
USPC .................... 336/200, 223, 232; 310/71, 208, 310/268
See application file for complete search history.

(56) References Cited

U.S. PATENT DOCUMENTS

| | | | | |
|---|---|---|---|---|
| 5,644,183 | A * | 7/1997 | Van Loenen et al. | ......... 310/268 |
| 7,071,805 | B2 | 7/2006 | Hasegawa et al. | |
| 7,291,956 | B2 * | 11/2007 | Itoh et al. | ...................... 310/208 |
| 8,193,678 | B2 * | 6/2012 | Horng et al. | .................. 310/208 |
| 2004/0263309 | A1 | 12/2004 | Ito et al. | |

FOREIGN PATENT DOCUMENTS

| | | |
|---|---|---|
| TW | 200849292 | 12/2008 |
| TW | 201108269 | 3/2011 |
| TW | M408911 | 8/2011 |

OTHER PUBLICATIONS

V. Fernandez et al., Design and Modelling of Permanent Magnet Micro-Bearings, IEEE Transactions on Magnetics, Sep. 1998, pp. 3596-3599, vol. 35, No. 5.
Shi-Uk Chung et al., Development of Brushless and Sensorless Vibration Motor Used for Mobile Phone, IEEE Transactions on Magnetics, Sep. 2002, pp. 3000-3002, vol. 38, No. 5.

(Continued)

*Primary Examiner* — Lincoln Donovan
*Assistant Examiner* — Ronald Hinson
(74) *Attorney, Agent, or Firm* — Morris Manning & Martin LLP; Tim Tingkang Xia, Esq.

(57) ABSTRACT

A multilayered miniature coil component, comprising a plurality of coil layers and insulating layers, the plurality of coil layers and insulating layers being alternately overlapped on each other. Each of the plurality of coil layers includes a plurality of coils and wires, each of the coils has a first and a second end, and a plurality of first conductive portions is disposed on each of the coil layers, at least one second conductive portion is disposed on at least one of the coil layers, and each of the plurality of insulating layers has a plurality of conductive through holes disposed correspondingly to the first conductive portions and the second conductive portions, thus through the plurality of wires, the first and the second conductive portions and the conductive through holes, the plurality of coils in each of the coil layers are composed as a circuit loop.

18 Claims, 4 Drawing Sheets

(56) References Cited

OTHER PUBLICATIONS

Sung Hong Won et al., Motion Transient Analysis of Flat-Type Vibration Motor for Mobile Phone, IEEE Transactions on Magnetics, Apr. 2006, pp. 851-854, vol. 42, No. 4.

Nicolas Achotte, et al., Planar Brushless Magnetic Micromotors, Journal of Microelectromechanical Systems, Aug. 2006, pp. 1001-1014, vol. 15, No. 4.

T.S. Low et al., Slotless PM Motor Design for Hard Disk Drives, IEEE Industry Applicatons Magazine, Nov./Dec. 1997, pp. 43-51.

* cited by examiner

MULTILAYERED MINIATURE COIL COMPONENT

CROSS-REFERENCE TO RELATED APPLICATIONS

This non-provisional application claims priority under 35 U.S.C. §119(a) on Patent Application No(s). 100141902 filed in Taiwan, R.O.C. on Nov. 16, 2011, the entire contents of which are hereby incorporated by reference.

BACKGROUND

1. Technical Field

The present disclosure relates to a coil component and more particularly to a miniature coil component formed by stacking of multiple coil layers.

2. Related Art

In today's electronics industry, electronic devices are getting more compact in size and delicate, while the functions of them are getting more powerful. Therefore, the electronic components inside an electronic device are also designed to be more delicate and compact. In various electronic components, the dimensions of a coil component are difficult to be reduced.

Take mini-sized motor as an example, a coil component is used as the motor stator. In the early stages of manufacturing, it is usually made by winding with enamel-insulated wires. The number of windings of the coil has to be increased in order for the coil to generate sufficient electromagnetic induction, as a result, the dimensions of the electronic components have to be increased as well.

In order to manufacture motors with smaller size, a stator coil composed of multilayered circuit boards is employed. In the application of a stator coil composed of multilayered circuit boards, the electrical connection among the circuit boards in multiple layers has to be taken into consideration, and therefore routing layers are included for connecting the circuit board to form circuit loops. However, the routing layers will result in an increased thickness for the mini-sized motor. If specific requirements of dimensions, such as requirement for miniaturization, have to be met, the number of circuit board layers has to be compromised and the density of the coil is therefore reduced. As a result, there will not be sufficient torque generated to drive the motor.

SUMMARY

A multilayered miniature coil component, comprising: a plurality of coil layers and a plurality of insulating layers, the plurality of coil layers and the plurality of insulating layers being alternatively overlapped on each other. Wherein, each of the plurality of coil layers includes a plurality of coils and a plurality of wires, each of the plurality of coils has a first end and a second end, and a plurality of first conductive portions is disposed on each of the plurality of coil layers, at least one second conductive portion is disposed on at least one of the plurality of coil layers, and each of the plurality of insulating layers has a plurality of conductive through holes disposed correspondingly to the first conductive portions and the second conductive portions, thus through the plurality of wires, the first conductive portions, the second conductive portions and the conductive through holes, the plurality of coils in each of the coil layers are composed as a circuit loop.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
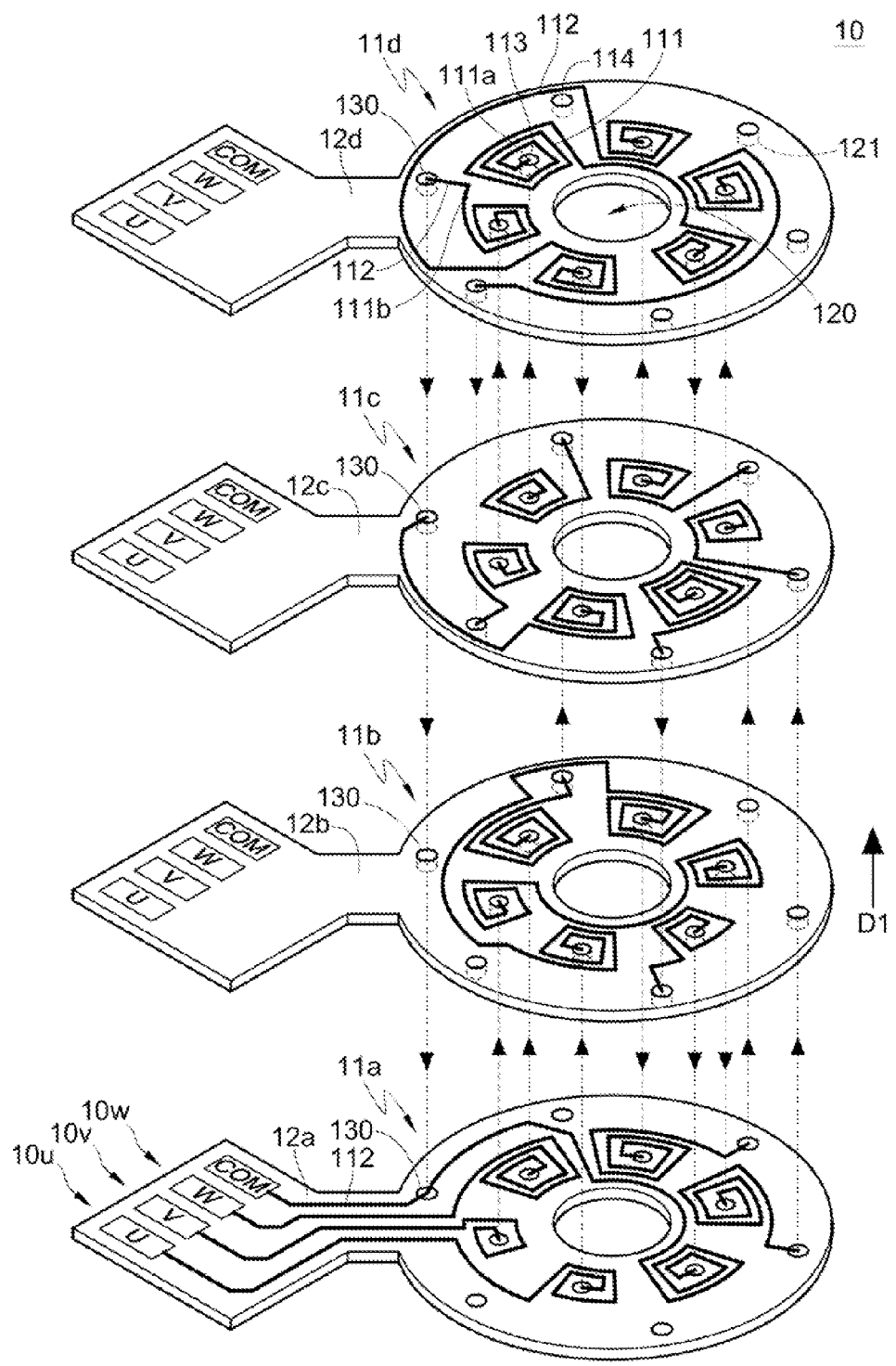
FIG. 1 is an exploded perspective view of a multilayered miniature coil component according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The detailed characteristics and advantages of the disclosure are described in the following embodiments in details, the techniques of the disclosure can be easily understood and embodied by a person of average skill in the art, and the related objects and advantages of the disclosure can be easily understood by a person of average skill in the art by referring to the contents, the claims and the accompanying drawings disclosed in the specifications.

Some embodiments of the disclosure provide a multilayered miniature coil component. The overall dimensions of the coil component can be reduced by disposing wires in coil layers and electrically conductive through holes between the coil layers.

Referring to FIG. 1, it shows an exploded perspective view of a multilayered miniature coil component 10 according to an embodiment of the disclosure. The multilayered miniature coil component 10 of the disclosure comprises: a plurality of coil layers 11a, 11b, 11c and 11d (hereinafter referring to the first coil layer 11a, the second coil layer 11b, the third coil layer 11c, and the fourth coil layer 11d); and a plurality of insulating layers 12a, 12b, 12c and 12d, wherein the coil layers 11a, 11b, 11c, 11d and the insulating layers 12a, 12b, 12c, 12d are overlapped on each other alternately. In this embodiment, the coil layers 11a, 11b, 11c and 11d are embedded on surfaces of the insulating layers 12a, 12b, 12c and 12d respectively. Each of the coil layers 11a, 11b, 11c and 11d includes a plurality of coils 111 and a plurality of wires 112. Each of the coils 111 has a first end 111a and a second end 111b. The coil 111 is winded outwardly from the first end 111a as its center to the second end 111b. A plurality of first conductive portions 113 is disposed on each of the coil layers 11a, 11b, 11c, 11d. At the same time, a plurality of second conductive portions 114 is disposed on each of the coil layers 11a, 11b, 11c, 11d. The first ends 111a are electrically connected to the first conductive portions 113. The second ends 111b are electrically connected to the wires 112. Each of the insulating layers 12a, 12b, 12c and 12d has a plurality of conductive through holes 121 corresponding to the first conductive portions 113 and the second conductive portions 114. The coils 111 of the coil layers 11a, 11b, 11c and 11d are composed as a circuit loop by the wires 112, the first conductive portions 113, the second conductive portions 114 and conductive through holes 121. In this embodiment, the first coil layer 11a and the fourth coil layer 11d may be called as the bottom coil layer 11a and the top coil layer 11d, respectively.

In this embodiment, a stator through hole 120 penetrates through the center of each of the insulating layers 12a, 12b, 12c and 12d. The coils 111 are arranged around the stator through hole 120. The second conductive portions 114 are disposed further away from the stator through hole 120 than the coils 111. In this embodiment, the coil layers 11a, 11b, 11c and 11d has an even number of the coils 111 respectively, and the coils 111 are arranged around the centers of the insulating layers 12a, 12b, 12c and 12d. The number of layers of the coil layers 11 is, for example, an even number. In this embodiment, a number of layers of the coil layers 11a, 11b, 11c and 11d is four, but this embodiment is not intended to limit the number of the coil layers. Here, the number of the second conductive portions 114 of each of the coil layers 11a, 11b, 11c and 11d is larger than or equal to a value acquired by following steps: subtracting the number of layers of the coil layers 11a, 11b, 11c and 11d by two; and then dividing the difference by two. The coils 111 are disposed in a fan shape.

As shown in FIG. 1, the multilayered miniature coil component 10 is divided into three coil sets 10w, 10v and 10u, and the coils sets 10w, 10v and 10u have electrodes W, V and U respectively and a common electrode COM. Each of the insulating layers 12a, 12b, 12c and 12d has a common electrode through hole 130 penetrating through it.

Figure 2:
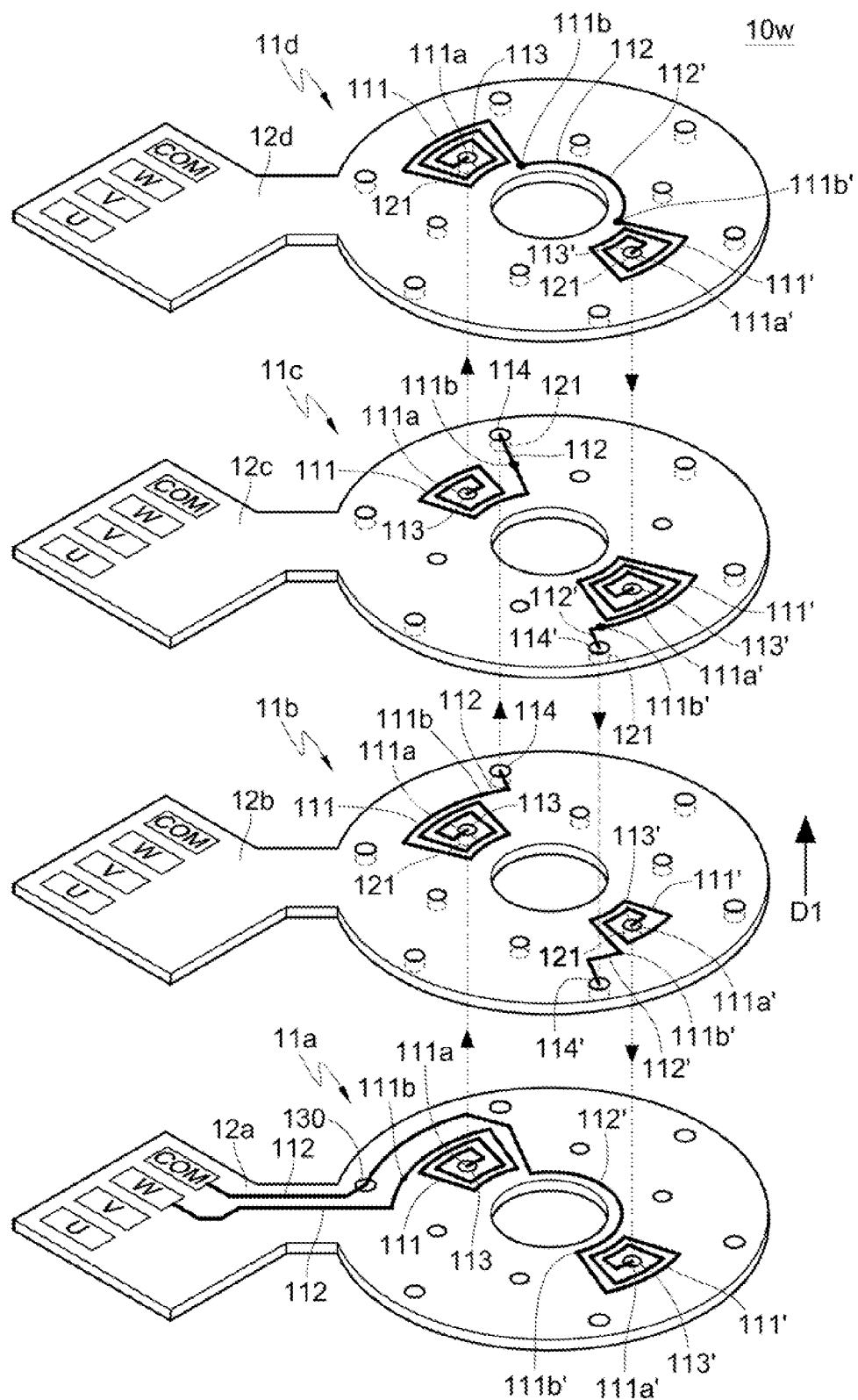
FIG. 2 is an exploded perspective view of a coil set 10w in FIG. 1.

Referring to FIG. 2, it shows an exploded perspective view of the coil set 10w in FIG. 1. As shown in FIG. 2, the second end 111b of the coil 111 in the coil layer 11a is connected to the electrode W of the coil set 10w through the wire 112, and the coil 111 of the coil layer 11a turns clockwise inwardly toward the first end 111a (the coil 111 turns anticlockwise outwardly to the second end 111b) to reach the first conductive portion 113. Then, the coil 111 of the coil layer 11a is electrically connected to the first conductive portion 113 of the adjacent coil layer 11b upwardly through the conductive through hole 121 in the insulating layer 12b.

In the coil layer 11b, the coil 111 is electrically connected to the first conductive portion 113 and turns clockwise outwardly from the first end 111a to the second end 111b. Therefore, the first ends 111a of the coils 111 in the adjacent coil layers 11a and 11b separated by the insulating layer 12b are electrically connected through the two first conductive portions 113 and the conductive through hole 121. the coil 111 of the coil layer 11a turns anticlockwise outwardly to surround the first end 111a of the coil 111 of the coil layer 11a. The coil 111 of the coil layer 11b turns clockwise outwardly to surround the first end 111a of the coil 111 of the coil layer 11b. The second end 111b of the coil 111 in the coil layer 11b is then electrically connected to the second conductive portion 114 through the wire 112. Then, the second end 111b of the coil 111 of the coil layer 11b is electrically connected to the second conductive portion 114 of the coil layer 11c upwardly through the conductive through hole 121 in the insulating layer 12c.

As shown in FIG. 2, in the coil layer 11c, the second conductive portion 114 is connected to the second end 111b of the coil 111 through the wire 112. Therefore, the wires 112 in the two coil layers 11b and 11c are electrically connected to the second conductive portion 114 of the two coil layers 11b and 11c. The coil 111 in the coil layer 11c turns clockwise inwardly toward the first end 111a, to reach the first conductive portion 113. Then, the coil 111 of the coil layer 11c is electrically connected to the first conductive portion 113 of the adjacent coil layer 11d upwardly through the conductive through hole 121 in the insulating layer 12d.

In the coil layer 11d, the coil 111 turns clockwise outwardly toward the second end 111b, from the first end 111a electrically connected to the first conductive portion 113. The second end 111b of the coil 111 in the coil layer 11d is then electrically connected to the other wire 112' through the wire 112. The wire 112' is electrically connected to the second end 111b' of the coil 111' in the coil layer 11d. The wires 112 and 112' of the coil layer 11d are electrically connected with each other. The coil 111' in the coil layer 11d turns clockwise inwardly from outside toward the first end 111a', to reach the first conductive portion 113'. Then, the conductive portion 113' is electrically connected to the first conductive portion 113' of the adjacent coil layer 11c downwardly through the conductive through hole 121 in the insulating layer 12d.

In the coil layer 11c, the other coil 111' turns clockwise outwardly from the first end 111a' electrically connected to the first conductive portion 113' toward the second end 111b'. The second end 111b' of the coil 111' in the coil layer 11c is then electrically connected to the second conductive portion 114' through the wire 112'. Then, the coil 111' is electrically connected to the second conductive portion 114' of the adjacent coil layer 11b downwardly through the conductive through hole 121 in the insulating layer 12c.

The second conductive portion 114' in the coil layer 11b is connected to the second end 111b' of the other coil 111' through the wire 112'. The coil 111' in the coil layer 11b turns clockwise inwardly from outside toward the first end 111a' to reach the first conductive portion 113'. Then, the coil 111' is electrically connected to the first conductive portion 113' of the adjacent coil layer 11a downwardly through the conductive through hole 121 in the insulating layer 12b.

In the coil layer 11a, the coil 111' turns clockwise outwardly from the first end 111a' electrically connected to the first conductive portion 113' toward the second end 111b'. The second end 111b' of the other coil 111' in the coil layer 11a is then electrically connected to the common electrode through hole 130 through the wire 112', then it is electrically connected to the common electrode COM through the wire 112. Accordingly, the coil set 10w composes a circuit loop.

In this embodiment, the coil layers 11a, 11b, 11c and 11d are stacked on each other in an arranging direction D1 from the bottom, and the conductive through holes 121 electrically connected to the first conductive portions 113 penetrate the insulating layer 12b between the odd numbered coil layer 11a and the even numbered coil layer 11b, and also penetrate the insulating layer 12d between the odd numbered coil layer 11c and the even numbered coil layer 11d. In this embodiment, there are four coil layers, i.e. the coil layers 11a, 11b, 11c and 11d, in the coil set 10w. Therefore the result obtained by subtracting the number of layers of the coil layers 11a, 11b, 11c and 11d by two and then dividing the difference by two is one. In the coil layers 11a, 11b, 11c and 11d, two second conductive portions, i.e. the second conductive portions 114 and 114', are used for forming the coil set 10w. The number of layers of the coil layers 11a, 11b, 11c and 11d is an even. And, they are divided into two sets, wherein one set includes the two coil layers 11a and 11b and the other set includes the other two coil layers 11c and 11d. The conductive through holes 121 are electrically connected to the second conductive portions 114 and 114' in the coil layers 11b and 11c of different sets. Therefore, the wires 112 and 112' of the coil layer 11d are electrically connected with each other, and the wires 112 and 112' in the other coil layers 11a, 11b and 11c are electrically connected to the second conductive portions 114.

Figure 3:
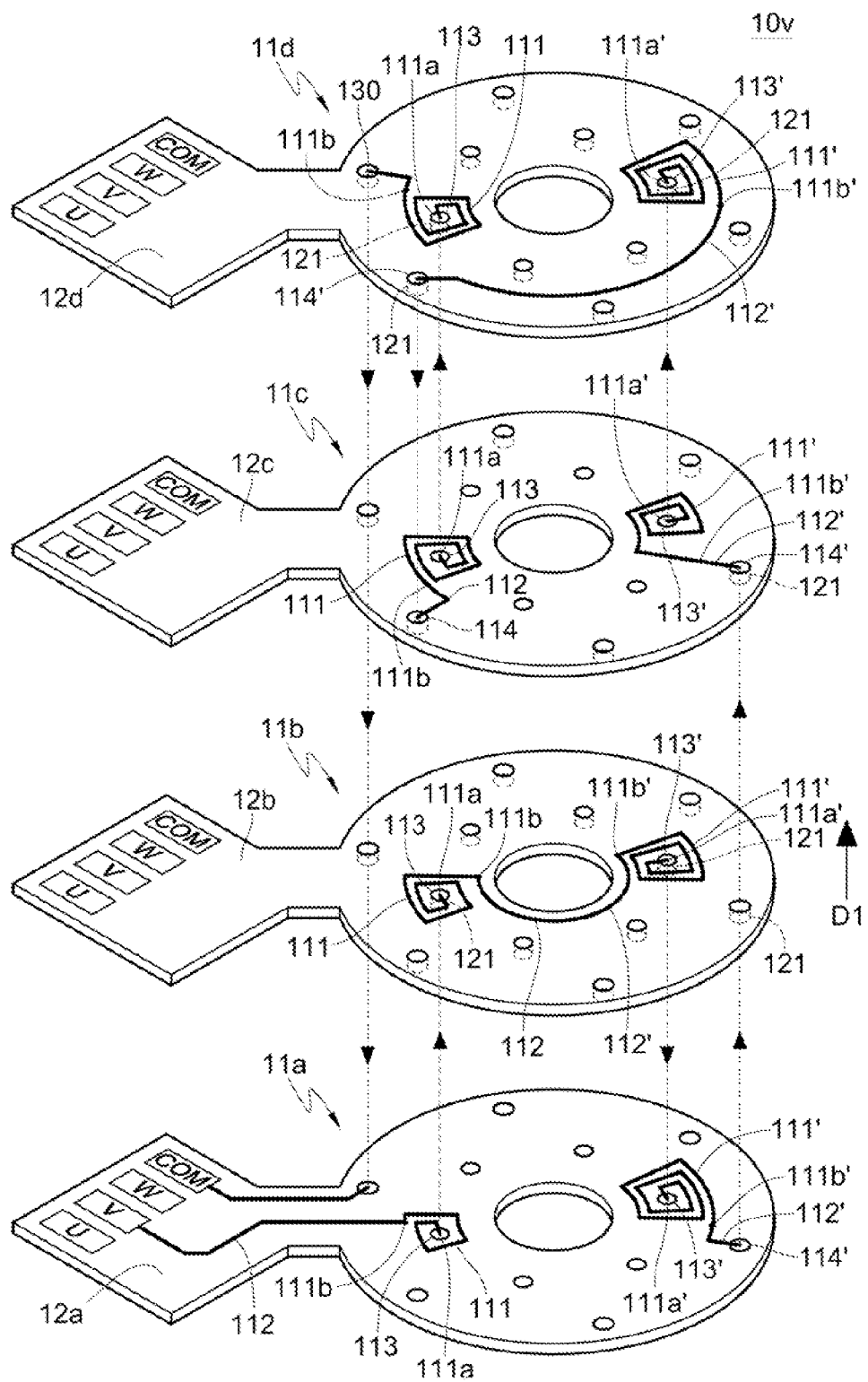
FIG. 3 is an exploded perspective view of a coil set 10v in FIG. 1.

Referring to FIG. 3, it shows an exploded perspective view of the coil set 10v in FIG. 1. As shown in FIG. 3, in the coil layer 11a, the second end 111b of one of the coils 111 is connected to the electrode V of the coil set 10v through the wire 112, the coil 111 turns clockwise inwardly toward the first end 111a, to reach the first conductive portion 113. Then, the coil 111 is electrically connected to the first conductive portion 113 of the adjacent coil layer 11b upwardly through the conductive through hole 121 of the insulating layer 12b.

In the coil layer 11b, the coil 111 turns clockwise outwardly from the first end 111a electrically connected to the first conductive portion 113 toward the second end 111b. The second end 111b of the coil 111 in the coil layer 11b is then electrically connected to the wire 112' through the wire 112. The wire 112' is electrically connected to the second end 111b' of the other coil 111' in the coil layer 11b. The wires 112 and 112' of the coil layer 11d are electrically connected with each other. The coil 111' in the coil layer 11b turns clockwise inwardly toward the first end 111a', to reach the first conductive portion 113'. Then, the coil 111' is electrically connected to the first conductive portion 113' of the adjacent coil layer 11a downwardly through the conductive through hole 121 of the insulating layer 12b.

In the coil layer 11a, the other coil 111' turns clockwise from the first end 111a' electrically connected to the first conductive portion 113' outwardly toward the second end 111b'. The second end 111b' of the other coil 111' in the coil layer 11a is then electrically connected to the second conductive portion 114' through the wire 112'. Then, the second end 111b' is electrically connected to the second conductive portion 114' in the coil layer 11c upwardly through the conductive through hole 121 of the insulating layers 12b and 12c by skipping the coil layer 11b therebetween.

The second conductive portion 114' of the coil layer 11c is connected to the second end 111b' of the coil 111' through the wire 112'. The coil 111' of the coil layer 11c turns clockwise inwardly from outside toward the first end 111a', to reach the first conductive portion 113'. Then, the coil 111' is electrically connected to the first conductive portion 113' of the adjacent coil layer 11d upwardly through the conductive through hole 121 of the insulating layer 12d.

In the coil layer 11d, the coil 111' turns clockwise outwardly from the first end 111a' electrically connected to the first conductive portion 113' toward the second end 111b'. The second end 111b' of the coil 111' in the coil layer 11d is then electrically connected to the second conductive portion 114' through the wire 112'. Then, the second end 111b' is electrically connected to the second conductive portion 114 of the adjacent coil layer 11c downwardly through the conductive through hole 121 of the insulating layer 12d.

The second conductive portion 114 of the coil layer 11c is connected to the second end 111b of the coil 111 through the wire 112. The coil 111 of the coil layer 11c turns clockwise inwardly toward the first end 111a from outside to the first conductive portion 113. Then, the coil 111 is electrically connected to the first conductive portion 113 of the adjacent coil layer 11d upwardly through the conductive through hole 121 of the insulating layer 12d.

In the coil layer 11d, the coil 111 turns clockwise from the first end 111a connected to the first conductive portion 113 outwardly toward the second end 111b. The second end 111b of the coil 111 in the coil layer 11c is then electrically connected to the common electrode through hole 130 through the wire 112. Then, the second end 111b is electrically connected to the coil layer 11a downwardly through the common electrode through hole 130 by skipping the coil layer 11b therebetween. Then the second end 111b is electrically connected to the common electrode COM through the wire 112 of the coil layer 11a. Accordingly, the coil set 10v composes a circuit loop.

In this embodiment, the coil layers 11a, 11b, 11c and 11d are stacked on each other in an arranging direction D1 from the bottom, a number of layers of the coil layers 11a, 11b, 11c and 11d of the coil set 10v is four, therefore the number of layers of the coil layers 11a, 11b, 11c and 11d is subtracted by two, and then the result obtaining by the difference value divided by two is one. A number of the second conductive portions 114 and 114' employed for the coil set 10v in the coil layers 11a, 11b, 11c and 11d is two which is larger than one. A number of layers of the coil layers 11a, 11b, 11c and 11d is an even number, and they are divided into two sets including the two coil layers 11a and 11b as a set and the other two coil layers 11c and 11d as another set, the conductive through hole 121 is electrically connected to the second conductive portions 114 and 114' in the coil layers 11b and 11c of different sets.

Figure 4:
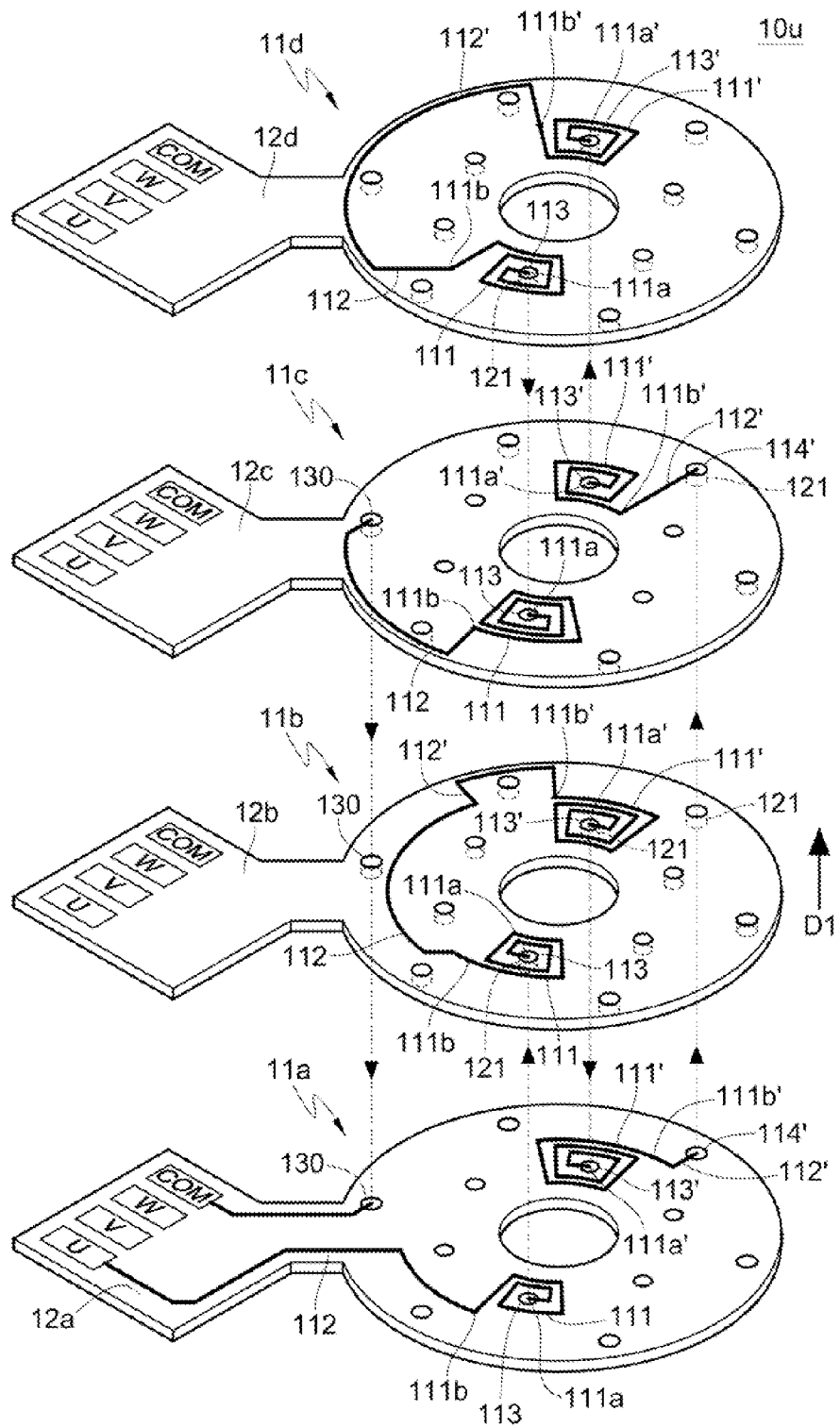
FIG. 4 is an exploded perspective view of a coil set 10u in FIG. 1.

Referring to FIG. 4, it shows an exploded perspective view of the coil set 10u in FIG. 1. As shown in FIG. 4, the second end 111b of one of the coils 111 in the coil layer 11a is connected to the electrode U of the coil set 10u through the wire 112, the coil 111 turns clockwise inwardly toward the first end 111a, to reach the first conductive portion 113. Then, the coil 111 is electrically connected to the first conductive portion 113 of the adjacent coil layer 11b upwardly through the conductive through hole 121 of the insulating layer 12b.

In the coil layer 11b, the coil 111 turns clockwise outwardly from the first end 111a electrically connected to the first conductive portion 113 toward the second end 111b. The second end 111b of the coil 111 in the coil layer 11b is then electrically connected to the other wire 112' through the wire 112. The wire 112' is electrically connected to the second end 111b' of the other coil 111' in the coil layer 11b, so that the wires 112 and 112' in the coil layer 11d are electrically connected with each other. The coil 111' of the coil layer 11b turns clockwise inwardly toward the first end 111a', to reach the first conductive portion 113'. Then, the coil 111' is electrically connected to the first conductive portion 113' of the adjacent coil layer 11a downwardly through the conductive through hole 121 of the insulating layer 12b.

In the coil layer 11a, the other coil 111' turns clockwise outwardly from the first end 111a' electrically connected to the first conductive portion 113' toward the second end 111b'. The second end 111b' of the other coil 111' in the coil layer 11a is then electrically connected to the second conductive portion 114' through the wire 112'. Then, the second end 111b' is electrically connected to the second conductive portion 114' of the coil layer 11c upwardly through the conductive through hole 121 of the insulating layers 12b and 12c by skipping the coil layer 11b therebetween.

The second conductive portion 114' in the coil layer 11c is connected to the second end 111b' of the coil 111' through the wire 112'. The coil 111' in the coil layer 11c turns clockwise inwardly toward the first end 111a' to reach the first conductive portion 113'. Then, the coil 111' is electrically connected to the first conductive portion 113' of the adjacent coil layer 11d upwardly through the conductive through hole 121 in the insulating layer 12d.

In the coil layer 11d, the coil 111' turns clockwise outwardly from the first end 111a' electrically connected to the first conductive portion 113' toward the second end 111b'. The second end 111b' of the coil 111' in the coil layer 11d is then electrically connected to the wire 112 through the wire 112'. The wire 112 is electrically connected to the second end 111b of the other coil 111 in the coil layer 11b, so that the wires 112 and 112' of the coil layer 11*d* are electrically connected with each other. The coil 111 of the coil layer 11*b* turns in clockwise inwardly from outside toward the first end 111*a* to reach the first conductive portion 113. Then, the coil 111 is electrically connected to the first conductive portion 113 of the adjacent coil layer 11*c* downwardly through the conductive through hole 121 of the insulating layer 12*d*.

In the coil layer 11*c*, the coil 111 turns clockwise outwardly from the first end 111*a* electrically connected to the first conductive portion 113 toward the second end 111*b*. The second end 111*b* of the coil 111 of the coil layer 11*c* is then electrically connected to the common electrode through hole 130 through the wire 112. Then, the second end 111*b* is electrically connected to the coil layer 11*a* downwardly through the common electrode through hole 130 by skipping the coil layer 11*b* therebetween, then the second end 111*b* is electrically connected to the common electrode COM through the wire 112 of the coil layer 11*a*. Accordingly, the coil set 10*v* composes a circuit loop.

Please refer to FIG. 1 again. At least one of the coil of the first (bottom) coil layer 11*a* turns clockwise inwardly and at least one of coils of the first (bottom) coil layer 11*a* turns counterclockwise inwardly. At least one of coils of the fourth (top) coil layer 11*d* turns clockwise inwardly and at least one of coils of the fourth (top) coil layer 11*d* turns counterclockwise inwardly. Further, both the (bottom) and the fourth (top) coil layer 11*a*, 11*d* comprise coils. In other words, each of the coil layers 11*a*, 11*b*, 11*c*, 11*d* comprises a plurality of coils 111,111'.

In this embodiment, the coil layers 11*a*, 11*b*, 11*c* and 11*d* are stacked on each other in an arranging direction D1 from the bottom, the wires 112 and 112' in the odd numbered coil layers 11*a* and 11*c* are electrically connected to the second conductive portion 114', and the wires 112 and 112' of the even numbered coil layers 11*b* and 11*d* are electrically connected with each other. In this embodiment, a number of layers of the coil layers 11*a*, 11*b*, 11*c* and 11*d* of the coil set 10*u* is four, therefore subtracting the number of layers of the coil layers 11*a*, 11*b*, 11*c* and 11*d* by two and then the result obtained by dividing the difference by two is one. A number of the second conductive portion 114' employed for the coil set 10*v* in the coil layers 11*a*, 11*b*, 11*c* and 11*d* is one.

As a conclusion from the above and according to the multilayered miniature coil component of the disclosure, by having the coils and the wires integrated in the coil layers, and by stacking the coils in multiple layers to form the coil component, the coil component with a large number of windings can be manufactured in a limited space. A larger number of the coil layers can be achieved with a same number of the insulating layers, so that a dimension of the thickness of the multilayered miniature coil component can be reduced. Furthermore, by cooperating with the first conductive portions and the connective and conductive through holes, the circuit loop can be electrically connected through the adjacent coil layers. Additionally, by cooperating with the second conductive portions and the connective and conductive through holes, the circuit loop can be electrically connected through the adjacent coil layers and also can be electrically connected by skipping a coil layer in between. Thereby, the circuit loop can have many different designs for applications with a high flexibility.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A multilayered miniature coil component, comprising:
a plurality of coil layers and a plurality of insulating layers, the plurality of coil layers and the plurality of insulating layers being alternatively overlapped on each other, wherein:
each of the plurality of coil layers includes a plurality of coils and a plurality of wires, each of the plurality of coils has a first end and a second end, and a plurality of first conductive portions is disposed on each of the plurality of coil layers, at least one second conductive portion is disposed on at least one of the plurality of coil layers;
each of the plurality of insulating layers has a plurality of conductive through holes disposed correspondingly to the first conductive portions and the second conductive portions;
through the plurality of wires, the first conductive portions, the second conductive portions and the conductive through holes, the plurality of coils in each of the coil layers are composed as a circuit loop;
the plurality of coil layers comprises a top coil layer and a bottom coil layer, wherein at least one of coils of the bottom coil layer turns clockwise inwardly and at least one of coils of the bottom coil layer turns counterclockwise inwardly, and at least one of coils of the top coil layer turns clockwise inwardly and at least one of coils of the top coil layer turns counterclockwise inwardly,
wherein two of the coils on non-adjacent two coil layers are directly electrically connected to each other via at least one of the conductive through holes, and the conductive through hole is separated from all of the wires and coils on the same insulating layer with the conductive through hole in order to be electrically isolated from all of the wires and coils on the same insulating layer with the conductive through hole.

2. The multilayered miniature coil component as claimed in claim 1, wherein the first ends are respectively electrically connected to the plurality of first conductive portions, and the second ends are respectively electrically connected to the plurality of wires.

3. The multilayered miniature coil component as claimed in claim 2, wherein the plurality of wires of at least one of the plurality of coil layers are electrically connected with each other.

4. The multilayered miniature coil component as claimed in claim 2, wherein the plurality of wires of at least two of the plurality of coil layers are electrically connected to the second conductive portion.

5. The multilayered miniature coil component as claimed in claim 1, wherein a stator through hole is penetrated through a center of each of the plurality of insulating layers, and the plurality of coils are arranged around the stator through hole.

6. The multilayered miniature coil component as claimed in claim 5, wherein the second conductive portions are disposed further away from the stator through hole than the plurality of coils.

7. The multilayered miniature coil component as claimed in claim 1, wherein each of the plurality of coil layers has an even number of the coils, and the plurality of coils are arranged around the center of each of the insulating layers.

8. The multilayered miniature coil component as claimed in claim 1, wherein the first ends of the coils of the adjacent coil layers separated by one of the plurality of insulating layers are electrically connected through the first conductive portions and the conductive through holes, one of the plurality of coils turns clockwise outwardly to surround the first end, and the other coil turns anticlockwise outwardly to surround the first end.

9. The multilayered miniature coil component as claimed in claim 1, wherein the plurality of coil layers are stacked on each other in an arranging direction, and the conductive through holes electrically connected to the first conductive portions are penetrated through the insulating layer between the odd numbered coil layer and the even numbered coil layer.

10. The multilayered miniature coil component as claimed in claim 1, wherein the coil layers are even numbered.

11. The multilayered miniature coil component as claimed in claim 1, wherein the number of the coil layers is larger or equal to four.

12. The multilayered miniature coil component as claimed in claim 1, wherein a number of the second conductive portions of each of the plurality of coil layers is larger than or equal to a quotient, which is acquired by subtracting a number of layers of the coil layers by two and then dividing the difference by two.

13. The multilayered miniature coil component as claimed in claim 1, wherein the coils are disposed surroundingly in a fan shape.

14. The multilayered miniature coil component as claimed in claim 1, wherein the plurality of coil layers are stacked on each other in an arranging direction, a number of the plurality of coil layers is an even number, each two coil layers of the plurality of coil layers are grouped as a set, and the connective conductive through hole is electrically connected to the second conductive portions of the plurality of coil layers in different sets.

15. The multilayered miniature coil component as claimed in claim 1, wherein the plurality of coil layers are stacked on each other in an arranging direction, the plurality of wires in the odd numbered coil layers are electrically connected to the second conductive portions, and the plurality of wires in the even numbered coil layers are electrically connected with each other.

16. The multilayered miniature coil component as claimed in claim 1, wherein the plurality of coil layers are stacked on each other in an arranging direction, the plurality of wires in one the coil layers uttermost are electrically connected with each other, and plurality of the wires of the other coil layers are electrically connected to the second conductive portion.

17. The multilayered miniature coil component as claimed in claim 1, further comprising a common electrode through hole penetrating through the insulating layers, wherein one of the plurality of wires in one of the plurality of coil layers is electrically connected to the common electrode through hole.

18. The multilayered miniature coil component as claimed in claim 1, wherein two ends of one of the plurality of wires are electrically connected to non-adjacent two coils on the same insulating layer with said wires.

* * * * *